United States Patent
Damera-Venkata (10) Patent No.: US 7,463,778 B2
(45) Date of Patent: Dec. 9, 2008

(54) MOTION ESTIMATION FOR COMPRESSING MULTIPLE VIEW IMAGES

(75) Inventor: Niranjan Damera-Venkata, Mountain View, CA (US)

(73) Assignee: Hewlett-Packard Development Company, L.P, Houston, TX (US)

(*) Notice: Subject to any disclaimer, the term of this patent is extended or adjusted under 35 U.S.C. 154(b) by 972 days.

(21) Appl. No.: 10/768,239

(22) Filed: Jan. 30, 2004

(65) Prior Publication Data

US 2005/0169543 A1 Aug. 4, 2005

(51) Int. Cl.
*G06K 9/00* (2006.01)

(52) U.S. Cl. .................. 382/236; 382/232; 382/238; 382/250; 382/251

(58) Field of Classification Search .............. 382/100, 382/106, 236, 238, 243, 154, 284, 294, 107, 382/103, 232, 250, 251; 348/42, 402, 407, 348/408, 400, 412, 400.1, 402.1, 403.1, 407.1, 348/408.1, 412.1, 669; 345/419, 427, 473; 386/68; 375/240.16

See application file for complete search history.

(56) References Cited

U.S. PATENT DOCUMENTS

| | | | |
|---|---|---|---|
| 5,535,288 A | | 7/1996 | Chen et al. |
| 5,742,710 A | * | 4/1998 | Hsu et al. ............ 382/236 |
| 5,793,985 A | | 8/1998 | Natarajan et al. |
| 5,953,458 A | | 9/1999 | Pirson et al. |
| 5,963,664 A | * | 10/1999 | Kumar et al. ........... 382/154 |
| 6,144,701 A | | 11/2000 | Chiang et al. |
| 6,205,241 B1 | | 3/2001 | Melon |
| 6,226,396 B1 | | 5/2001 | Marugame |
| 6,266,158 B1 | | 7/2001 | Hata et al. |
| 6,339,617 B1 | | 1/2002 | Ueda |
| 6,542,547 B1 | | 4/2003 | Wong |
| 6,584,226 B1 | | 6/2003 | Chaddha et al. |
| 6,628,419 B1 | * | 9/2003 | So et al. ............ 358/1.16 |

(Continued)

FOREIGN PATENT DOCUMENTS

WO      WO 03/43342      5/2003

OTHER PUBLICATIONS

M. Magnor et al., "Data compression for light-field rendering," Transactions Letters, IEEE Transactions on circuits and systems for video technology, vol. 10, No. 3, pp. 338-343 (Apr. 2000).

(Continued)

*Primary Examiner*—Samir A. Ahmed
*Assistant Examiner*—Mehdi Rashidian (57) ABSTRACT

Systems and methods of estimating motion for compressing multiple view images are described. In accordance with a machine-implemented method of encoding a target image of a scene captured at a first image plane, a transformation is computed. The transformation maps at least three noncollinear points substantially coplanar on a scene plane in the target image to corresponding points in a references image of the scene captured at a second image plane different from the first image plane. At least one point in the target image off the scene plane and at least one corresponding point in the reference image are identified. A motion between the target image and the reference image is estimated based on the computed transformation and the identified corresponding off-scene-plane points. The target image is encoded based at least in part on the estimated motion.

30 Claims, 5 Drawing Sheets

U.S. PATENT DOCUMENTS

| | | | |
|---|---|---|---|
| 7,286,689 B2* | 10/2007 | Damera-Venkata et al. | 382/107 |
| 2002/0001406 A1 | 1/2002 | Kochi et al. | |
| 2002/0110275 A1 | 8/2002 | Rogina et al. | |
| 2003/0044048 A1 | 3/2003 | Zhang et al. | |
| 2004/0081239 A1 | 4/2004 | Patti et al. | |
| 2004/0131267 A1 | 7/2004 | Adiletta et al. | |
| 2004/0165781 A1 | 8/2004 | Sun | |

OTHER PUBLICATIONS

M. Magnor et al., "Model-based coding of multi-view point imagery," SPIE Conference Proceedings visual communications and image processing, Perth Australia, pp. 14-22 (Jun. 2000).

M. Magnor et al., "Hierarchical coding of light fields with disparity maps," IEEE conference proceedings: International conference on image processing, Kobe, JP, vol. 3, pp. 334-338 (Oct. 1999).

M. Magnor et al., "Multi-view image coding with depth maps and 3-D geometry for prediction," SPIE conference proceedings: Visual communications and image processing, San Jose, CA pp. 273-271 (Jan. 2001).

M. Levoy et al., "Light field rendering," Proc. ACM SIGGRAPH '96, 12 pages (1996).

Mendonca et al, "Epipolar Geometry from Profiles under Circular Motion," Feb. 13, 2001, http://www.csis.hku.hk/~kykwong/publications/prsmendonca_pami01.pdf, 35 pages.

Quddus et al. "A New Compression Technique for Binary Test Images," Jul. 1-3, 1997 IEEE Digital Object Identifier, pp. 194-198.

Wang et al. "Multiview Video Sequence Analysis, Compression, and Virtual Viewpoint Synthesis," Apr. 2000, IEEE Trans. on Circuits and Systems for Video Tech., vol. 1, No. 3, pp. 397-410.

* cited by examiner

MOTION ESTIMATION FOR COMPRESSING MULTIPLE VIEW IMAGES

BACKGROUND

In many application environments, an image sequence is encoded (or compressed) to reduce the total amount of data needed to represent the image sequence. The compressed data may then be stored or transmitted more efficiently than the original uncompressed image sequence data. The image sequence may be any sequence of images, including a sequence of video image frames and a sequence of still images. Multiple view image sequences are sequences of images corresponding to different views of a scene; the images may be captured by a single camera positioned at different viewpoints, or the images may be captured by multiple cameras positioned at different locations relative to the scene to capture the scene from different viewpoints.

Image compression methods typically fall into one or more of three main image compression classes: spectral redundancy reduction, spatial redundancy reduction, and temporal redundancy reduction. Spectral redundancy reduction methods typically reduce the amount of image data by discarding spectral data that are not strongly perceived by human eyes. Spatial redundancy reduction methods reduce higher spatial frequency components in the original image data. For example, transform coding is a common spatial redundancy compression method that involves representing an image by a set of transform coefficients. The transform coefficients are quantized individually to reduce the amount of data that is needed to represent the image. A representation of the original image is generated by applying an inverse transform to the transform coefficients. Temporal redundancy reduction methods compress a sequence of images by taking advantage of similarities between successive images. Temporal redundancy may be reduced, for example, by transmitting only those movements or changes in a given image that permit accurate reconstruction of the given image from another image (e.g., a previously received video image frame).

Various different standards of image sequence compression have been developed, often based on block-matching methods. Block-matching methods initially divide a target image (or frame in the case of video image data) to be compressed into an array of blocks (or tiles). Motion data and motion compensation difference data are generated for each block based on a set of data in a reference image (e.g., in a prior video frame) that is similar to the block. In a typical approach, the target image is completely divided into contiguous blocks and sets of pixels in the reference image that best match each block are identified. The target image is reconstructed by accessing and manipulating portions of the reference image. The motion data represents an amount of movement that repositions a suitable part of the reference image to reconstruct a given block of the target image, and the motion-compensated difference data represents intensity adjustments that are made to individual pixels within the set of data from the reference image to accurately reproduce the given block of the target image.

Various methods for computing motion vectors between blocks of a target image and corresponding blocks of a reference image have been proposed. In a typical block matching approach, a current block is compared with all the blocks of like size in a search window superimposed on the reference image. Typically, image blocks of the target image and the reference image are compared by calculating an error function value for each possible match. The motion vector with the smallest error function value is selected as the best matching motion vector for a given target image block. Exemplary block matching error functions are the sum of the absolute values of the differences of the pixels between matched blocks and the sum of the squares of the differences. Motion estimation typically requires a significant portion of the computational resources needed to implement any given image sequence compression method.

SUMMARY

The invention features systems and methods of estimating motion for compressing multiple view images.

In one aspect, the invention features a machine-implemented method of encoding a target image of a scene captured at a first image plane. In accordance with this inventive method, a transformation is computed. The transformation maps at least three noncollinear points substantially coplanar on a scene plane in the target image to corresponding points in a references image of the scene captured at a second image plane different from the first image plane. At least one point in the target image off the scene plane and at least one corresponding point in the reference image are identified. A motion between the target image and the reference image is estimated based on the computed transformation and the identified corresponding off-scene-plane points. The target image is encoded based at least in part on the estimated motion.

The invention also features an apparatus and a machine-readable medium implementing the above-described method.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Overview

The image encoding embodiments described in detail below provide an efficient way to estimate motion between a target image and a reference image that may be incorporated readily into any image compression apparatus or process. These embodiments leverage geometric information computed from certain readily obtainable points in a scene to reduce the size of the search space that is searched to identify points in the reference image corresponding to points in the target image.

Figure 1A:
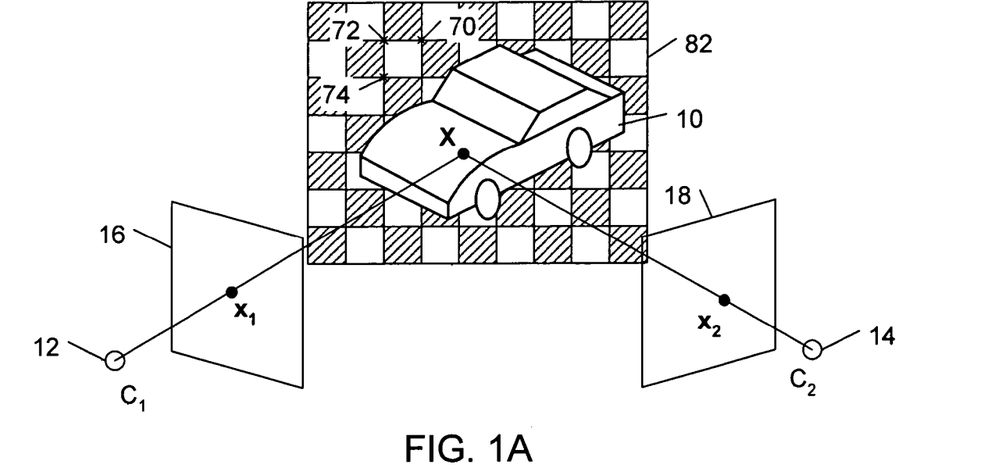
FIG. 1A is a diagrammatic view of a scene of a car being imaged by two cameras positioned at different viewpoints.
Figure 1B:
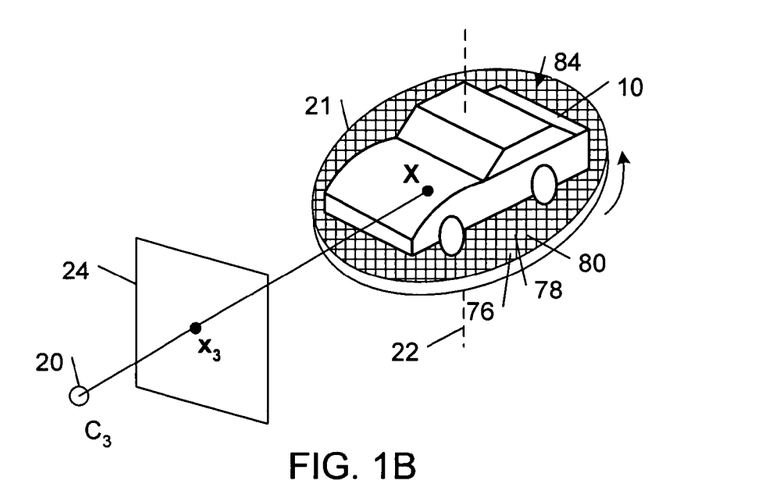
FIG. 1B is a diagrammatic view of a scene of a car on a turntable configured to rotate so that a single camera may image the scene from different viewpoints.

FIGS. 1A and 1B show different ways in which multiple view images of a scene may be captured by one or more cameras. As used herein, the term "multiple view images" refers to images of a scene captured from multiple viewpoints. The terms cameras, imaging devices, and image sensors are used interchangeably herein. Exemplary cameras include computer-controllable digital cameras (e.g., a Kodak DCS760 camera), USB video cameras, and Firewire/1394 cameras.

In the implementation of FIG. 1A, images of a scene containing a car 10 are captured by first and second cameras 12, 14 (indicated by their centers $C_1$, $C_2$) that are positioned at different viewpoints. The first camera 12 captures images at a scene plane 16 and the second camera 14 captures images at a scene plane 18. As shown in FIG. 1A, point X in the scene is imaged at the image planes 16, 18 by a pair of corresponding points $x_1$, $x_2$. The points, lines, and planes described herein are represented using homogeneous coordinates. In this representation, the triple of real numbers (x:y:t), with t≠0, is a set of homogeneous coordinates for a point with Cartesian coordinates (x/t, y/t).

In the implementation of FIG. 1B, images of a scene containing car 10 are captured by a single camera 20 (indicated by its center $C_3$). The camera 20 may be positioned at different viewpoints relative to the scene. In the illustrated implementation, the position of the camera 20 is fixed and the position of the car 10, which is supported on a turntable 21 that is configured to rotate about an axis 22, changes over time. In this way, the camera 20 is able to capture a sequence of images at an image plane 24 from respective viewpoints that change over time. In other implementations, the position of the car 10 may be fixed, and the position of the camera 20 relative to the car 10 may be changed over time.

Figure 2:
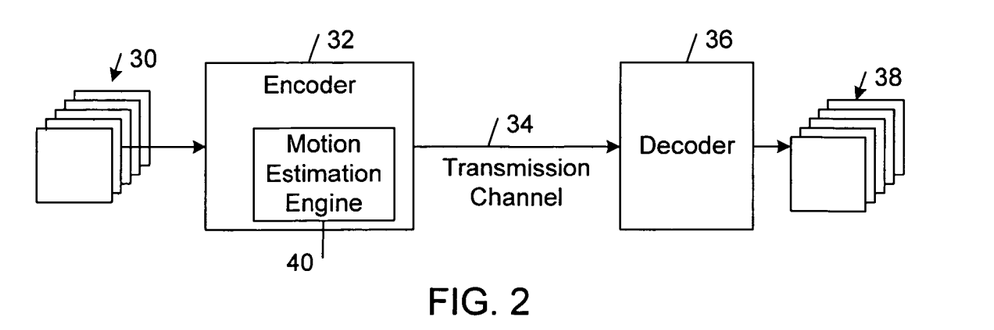
FIG. 2 is a block diagram of an encoder encoding a sequence of images and transmitting the encoded image data over a transmission channel, and a decoder decoding the transmitted images to generate a sequence of decoded images.

FIG. 2 shows multiple view images 30, an encoder 32, a transmission channel 34, a decoder 36, and a set 38 of decoded images. The multiple view images 30 may be video or still images and may be in an analog or a digital format. The pixels of the multiple view images 30 may be presented in an original color model representation (e.g., RGB). The encoder 32 may process the image data in the original color model representation, or encoder 32 may convert the image data to a different color model representation (e.g., YUV) before processing the image data. The encoder 32 includes a motion estimation engine 40, which estimates motion between pairs of multiple view images. Encoder 32 uses the motion estimates to compress the multiple view images 30 by reducing redundancy between the pairs of multiple view images 30. The compressed image data, which includes motion vectors and motion compensation difference data, is transmitted over the transmission channel 34. The transmission channel may be a wired or wireless data transmission connection. The decoder 36 generates decoded images 38 from the image data received over the transmission channel 34 to reconstruct the multiple view images.

Figure 3:
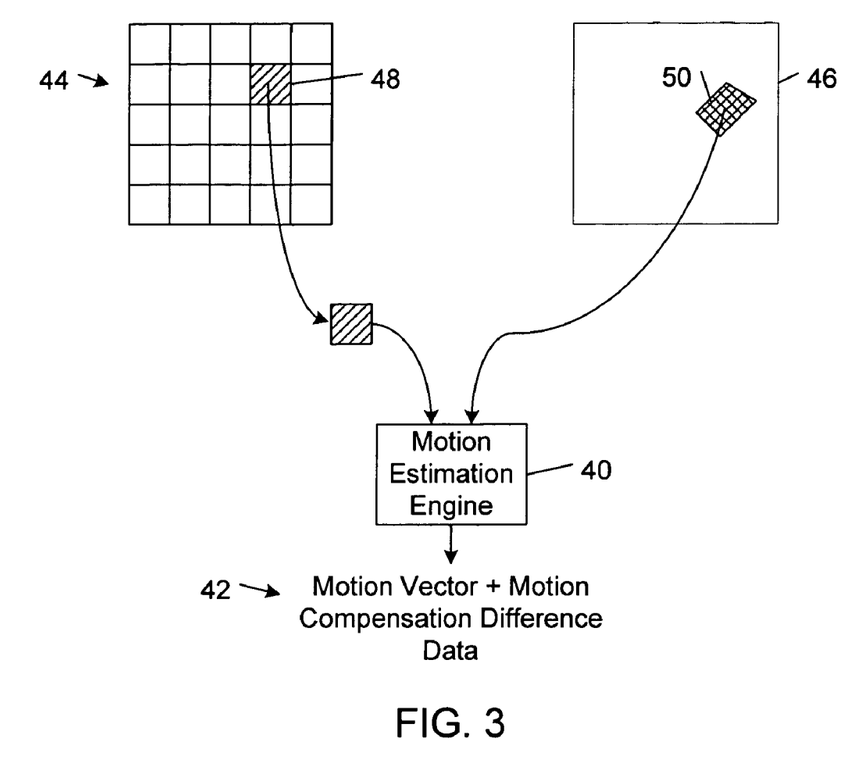
FIG. 3 is a diagrammatic view of an implementation of a motion estimation engine configured to identify a block of points in a reference image matching a corresponding block in a target image and to compute a motion vector and motion compensation difference data based on the target image block and the identified reference image block.

FIG. 3 shows an embodiment of motion estimation engine 40 that is configured to compute motion vector and motion compensation difference data 42 for a pair of multiple view images 44, 46. The image 44 to be encoded is referred to herein as the "target image" and the image 46 that is used to encode the target image 44 is referred to herein as the "reference image". These terms are used herein without regard to the temporal ordering (e.g., by capture times or by transmission times) of the images. In this embodiment, the motion estimation engine 40 divides the target image 44 into an array of contiguous, non-overlapping blocks of points. As explained in detail below, for each block 48 motion estimation engine 40 identifies in the reference image 46 a block 50 of points substantially corresponding to the points of block 48. As used herein, a "point" may refer to an individual pixel of an image or may refer to a group of pixels of an image. In this embodiment, there is a one-to-one correspondence between the points of target image block 48 and the points of reference image block 50. As shown in FIG. 3, the reference image block 50 may be deformed (e.g., rotated, translated, or skewed) relative to the target image block 48. Based on the target image block 48 and the corresponding reference image block 50, motion estimation engine 40 computes a motion vector describing movement of the point locations of the reference image block 50 to the locations of the corresponding points of the target image block 48. The motion estimation engine 40 also computes motion compensation difference data that represents intensity adjustments to the points of the reference image block 50 to reproduce the intensity values of the corresponding points of the target image block 48.

Figure 4:
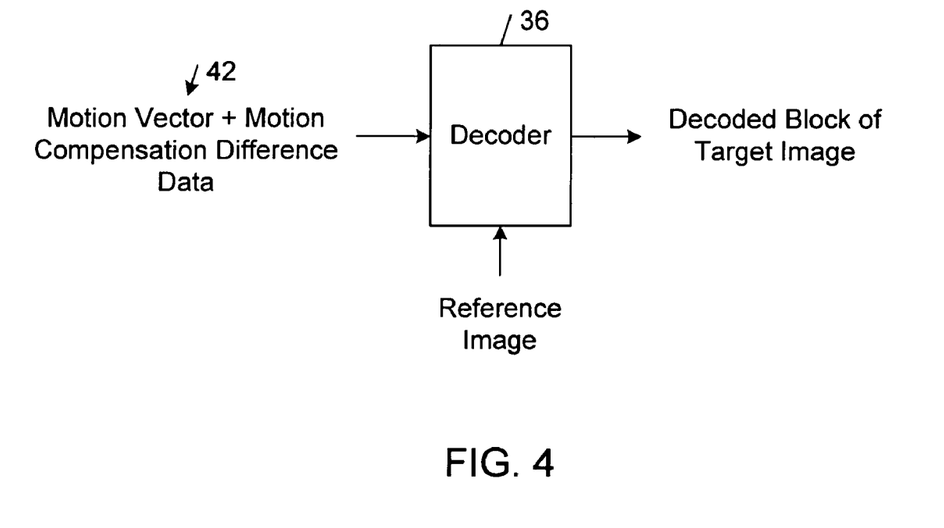
FIG. 4 is a block diagram of an implementation of a decoder configured to compute a decoded block of a target image based on a reference image, a motion vector computed for the target image block, and motion compensation difference data computed for the target image block.

FIG. 4 shows an embodiment of decoder 36 that decodes the motion vector and motion compensation difference data 42 computed for a given block of target image 44 based on the reference image 46. In particular, decoder 36 identifies the block in the reference image corresponding to the given target image block using the motion vector. Decoder 36 then adjusts the point values of the identified reference image block using the motion compensation difference data to decode (and thereby reconstruct) the give target image block. This process is repeated for each block of the target image until the entire target image is reconstructed by the decoder 36.

The encoder 32 and the decoder 36 may be incorporated in the same device or in difference devices. In general, encoder 32 and decoder 36 are not limited to any particular hardware or software configuration, but rather they may be implemented in any computing or processing environment, including in digital electronic circuitry or in computer hardware, firmware, device driver, a codec (e.g., an MPEG video codec), or software. The encoder 32 and the decoder 36 may be embedded in the hardware of any one of a wide variety of electronic devices, including desktop computers, laptop computers, and portable electronic devices (e.g., digital still image camera, digital video cameras, mobile phones and personal digital assistants). In some implementations, each of encoder 32 and decoder 36 is implemented, at least in part, in a computer process product tangibly embodied in a machine-readable storage device for execution by a computer processor. In some embodiments, encoder 32 and decoder 36 preferably are implemented in a high level procedural or object oriented processing language; however, the algorithms may be implemented in assembly or machine language, if desired. In any case, the processing language may be a compiled or interpreted language. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

II. Estimating Motion Between Pairs of Multiple View Images

Figure 5:
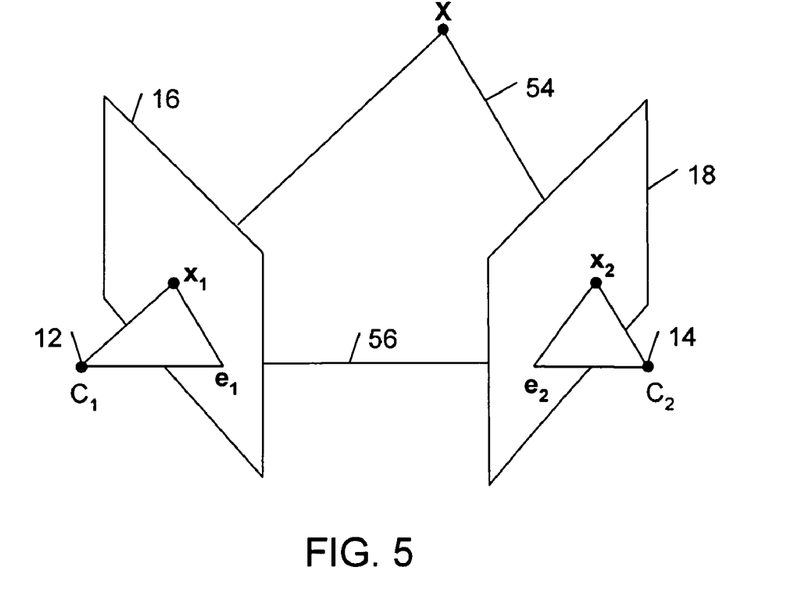
FIG. 5 is a diagrammatic view of epipolar geometric relationship between a point in a scene imaged by two cameras from different viewpoints.
Figure 6:
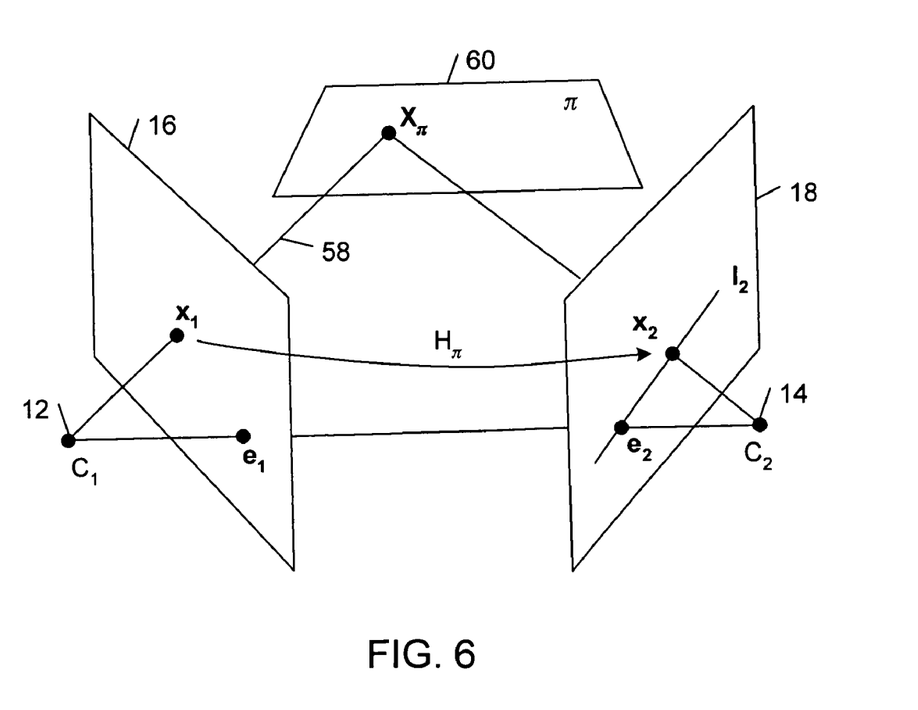
FIG. 6 is a diagrammatic view of a mapping between an image of a point on a plane in a scene at a first image plane and a corresponding image of the scene plane point at a second image plane.
Figure 7:
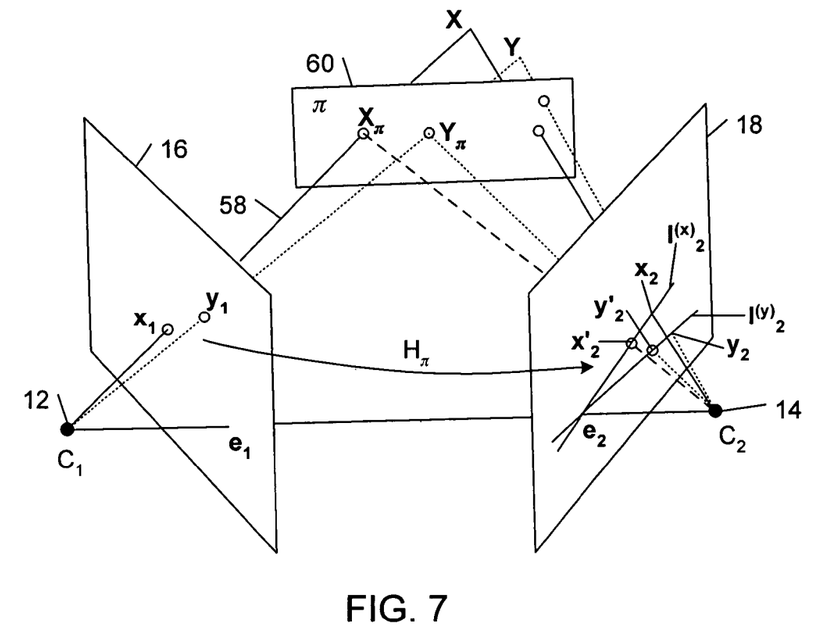
FIG. 7 is a diagrammatic view of a mapping between an image of an off-scene-plane point at a first image plane and a corresponding image of the off-scene-plane at a second image plane.

As mentioned above, the image encoding embodiments described herein provide an efficient way to estimate motion between a target image and a reference image that leverages geometric information computed from certain readily obtainable points in a scene to reduce the size of the search space that is searched to identify points in the reference image corresponding to points in the target image. FIGS. 5, 6, and 7 show the geometric relationships between a pair of multiple view images that are leveraged by the image encoding embodiments described herein.

FIG. 5 shows the point correspondence geometry for a pair of cameras 12, 14 with respective centers $C_1$, $C_2$ and respective image planes 16, 18. As shown, the camera centers $C_1$, $C_2$, the 3-space point X, and the images $x_1$, $x_2$ of the point X in image planes 16, 18 lie in a common plane 54, which is referred to herein as an "epipolar plane". Upper case variables are used herein to represent three-dimensional world coordinates, and lower case variables are used to represent two-dimensional image plane coordinates. A camera baseline 56 connects the centers $C_1$, $C_2$ of cameras 12, 14, and intersects the image planes 16, 18 at respective points $e_1$, $e_2$, which are referred to herein as "epipoles".

Referring to FIG. 6, a ray 58 that extends through the first camera center C, and point x, in image plane 16 meets a plane 60 (labeled π), which does not pass through either of the two camera centers $C_1$, $C_2$, at a point $_\pi$. Point $X_\pi$ projects to a point $x_2$ in the second image plane 18. Since $X_\pi$ lies on the ray 58 corresponding to $x_1$, the projected point $x_2$ must lie on the epipolar line $l_2$ corresponding to the image of ray 58 in image plane 18. The points $x_1$, $x_2$ are images of the three-dimension point $X_\pi$ lying on plane 60. The set of all such points $x^{(i)}_1$ in the first image plane 16 and the corresponding points $x^{(i)}_2$ in the second image plane 18 are related by a two-dimensional homography $H_\pi$ that maps each $x^{(i)}_1$ to $x^{(i)}_2$. That is, $$x^{(i)}_1 = H_\pi \cdot x^{(i)}_2 \quad (1)$$
where $$H_\pi = \begin{bmatrix} H_{11} & H_{12} & H_{13} \\ H_{21} & H_{22} & H_{23} \\ H_{31} & H_{32} & H_{33} \end{bmatrix} \quad (2)$$

Since $H_\pi$ has eight degrees of freedom up to scale, $H_\pi$ may be determined from four sets of corresponding points, $x^{(i)}_1 \Leftrightarrow x^{(i)}_2$, where i has an integer value from 1 to 4. In some implementations, more than four sets of correspondence points may be used in a singular value decomposition process to determine a least-squares solution for H.

FIG. 7 shows a point X that is not on the plane 60. A ray through X intersects the plane 60 at the point $X_\pi$. The images of X and $X_\pi$ are coincident points at $x_1$ in the first image plane 16. In the second image plane, X and $X_\pi$ are imaged at $x_2$ and $x'_2 = H_\pi x_1$, respectively. The points $x_2$ and $x'_2$ both lie on the epipolar line $l_2$. The vector between the points $x_2$ and $x'_2$ is the parallax relative to the homography induced by the plane 60. In this geometry, the epipolar line $l^{(x)}_2$ is given by:

$$l^{(x)}_2 = x'_2 \times x_2 \quad (3)$$

where x is the cross product operator. Since $x'_2 = H_\pi x_1$, $$l^{(x)}_2 = (H_\pi x_1) \times x_2 \quad (4)$$

Similarly, the epipolar line $l^{(y)}_2$ is given by:

$$l^{(y)}_2 = y'_2 \times y_2 \quad (5)$$

and since $y'_2 = H_\pi y_1$, $$l^{(y)}_2 = (H_\pi y_1) \times y_2 \quad (6)$$

The epipole $e_2$ may be computed from $l^{(x)}_2 \times l^{(y)}_2$ which are given by equations (4) and (6), if the corresponding off-scene-plane points $x_1 \Leftrightarrow x_2$ and $y_1 \Leftrightarrow y_2$ are known. The epipole $e_2$ then may be used to determine epipolar lines in the image plane 18. With this information, any given point $w_2$ in the second image plane 18 corresponds to the homographic projection of a corresponding point $w_1$ in the first image plane 16 plus a possible displacement along the epipolar line $l^{(w)}_2$. That is, $$w_2 = (H_\pi w_1) + \Theta \cdot e_2 \quad (7)$$

where $\Theta$ is a scalar.

In some implementations, the full projection model of equation (2) is approximated by an affine approximation model. The accuracy of this model improves as the distances of points in the scene to the centers of the camera(s) become much greater than the distances between points in the scene. In this model, the transformation is given by:

$$H_\pi = \begin{bmatrix} H_{11} & H_{12} & H_{13} \\ H_{21} & H_{22} & H_{23} \\ 0 & 0 & 1 \end{bmatrix} \quad (8)$$

Since $H_\pi$ has six degrees of freedom up to scale in the affine approximation model, $H_\pi$ may be determined from three sets of corresponding points, $x^{(i)}_1 \Leftrightarrow x^{(i)}_2$, where i has an integer value from 1 to 3. In the affine approximation model, the epipolar lines are assumed to be parallel, in which case only a single epipolar line is needed to determine the epipole $e_2$. Indeed, if an epipolar line $l_2 = (a,b,c)$, then the corresponding epipole $e_2=(-b,a,0)$. The epipolar line $l_2$ may be determined from images of a single off-scene-plane point (e.g., point X).

Figure 8:
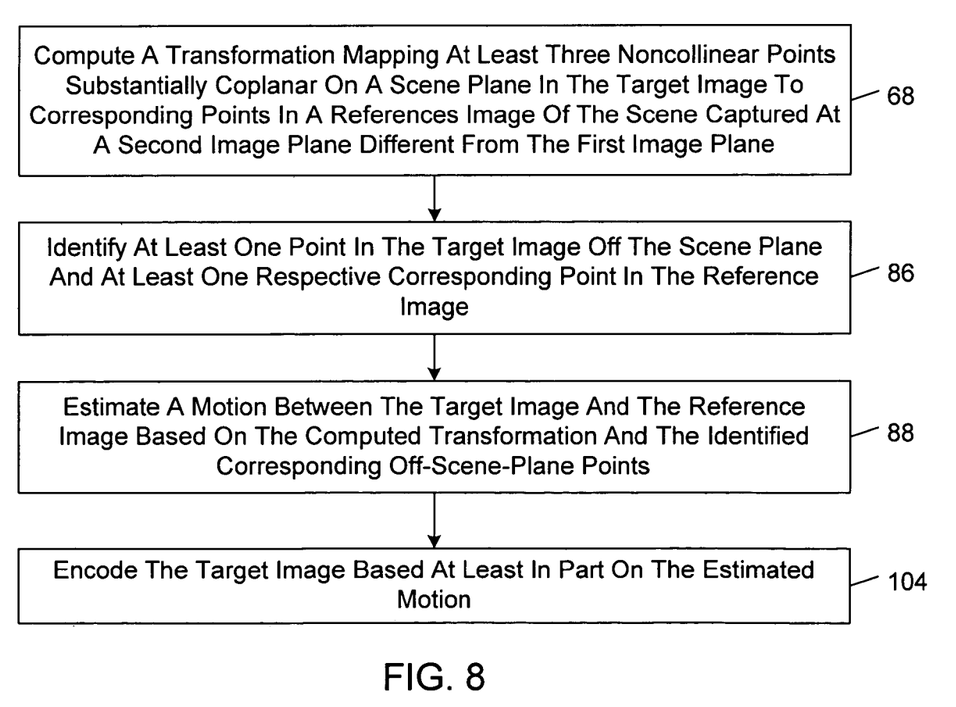
FIG. 8 is a flow diagram of an implementation of a method of encoding a target image of a scene.

FIG. 8 shows an embodiment of a method by which encoder 32 encodes multiple view images of a scene based on the geometric relationships described above in connection with FIGS. 5-7. In this method, the encoder 32 computes a transformation (e.g., $H_\pi$) (step 68). Encoder 32 computes the transformation based on three pairs of corresponding scene-plane points by solving for the coefficients of the transformation matrix in equation (2).

Referring back to FIGS. 1A and 1B, the transformation $H_\pi$ is computed from images of at least three noncollinear points 70, 72, 74 (FIG. 1A) or 76, 78, 80 (FIG. 1B) that are substantially coplanar on a planar surface 82 (FIG. 1A) or 84 (FIG. 1B) in the scene. If the full projection model of equation (2) is used, at least four nonlinear, substantially coplanar points in the scene are used to compute $H_\pi$. If the above-described affine approximation model is used, at least three nonlinear, substantially coplanar points in the scene are used to compute $H_\pi$. The transformation $H_\pi$ maps the noncollinear, substantially coplanar points imaged in the target image to corresponding points imaged in the reference image of the scene. The scene planes 82, 84 may correspond to any planar surface in the scene. In the implementation illustrated in FIG. 1A, the scene plane 82 corresponds to a known checkerboard pattern and the noncollinear, coplanar scene plane points 70-74 correspond three corner points of one of the checkerboard squares. In the implementation illustrated in FIG. 1B, the scene plane 84 corresponds to the top surface of turntable 21, which includes a regular pattern. The checkerboard pattern on scene plane 82 and the regular pattern on scene plane 84 enable the pairs of corresponding points in image planes 16, 18 to be easily and accurately determined. In other implementations, point correspondences may be determined in another way (e.g., by projecting known light patterns onto a planar surface in the scene). The correspondences between scene-plane points may be determined automatically using any automatic point correspondence matching process. Alternatively, a user may identify the correspondences between scene-plane points manually.

Encoder 32 also identifies at least one point (e.g., point X) in the scene that does not lie on the planar surface used to compute the transformation $H_\pi$. This point is imaged by a point (e.g., point $x_1$) in the target image plane 16 and a corresponding point (e.g., point $x_2$) in the reference image plane 18 (step 86). Only one pair of corresponding off-scene-plane points is used in the affine approximation model, whereas two such pairs of points are used in the full projection model of equation (2). The off-scene-plane points may be determined automatically using any automatic point correspondence matching process, or a user may identify the corresponding off-scene-plane points manually.

Based on the computed transformation and the identified corresponding off-scene-plane points, the encoder 32 estimates motion between the target image and the reference image (step 88). In some implementations, using equations (4) and (6) the encoder 32 computes the epipole $e_2$ in the reference image plane 18 based on the identified corresponding off-scene-plane points. The epipole $e_2$ is used to reduce the search space for blocks in the reference image that match corresponding blocks in the target image to a single dimension, as explained in detail below.

Figure 9:
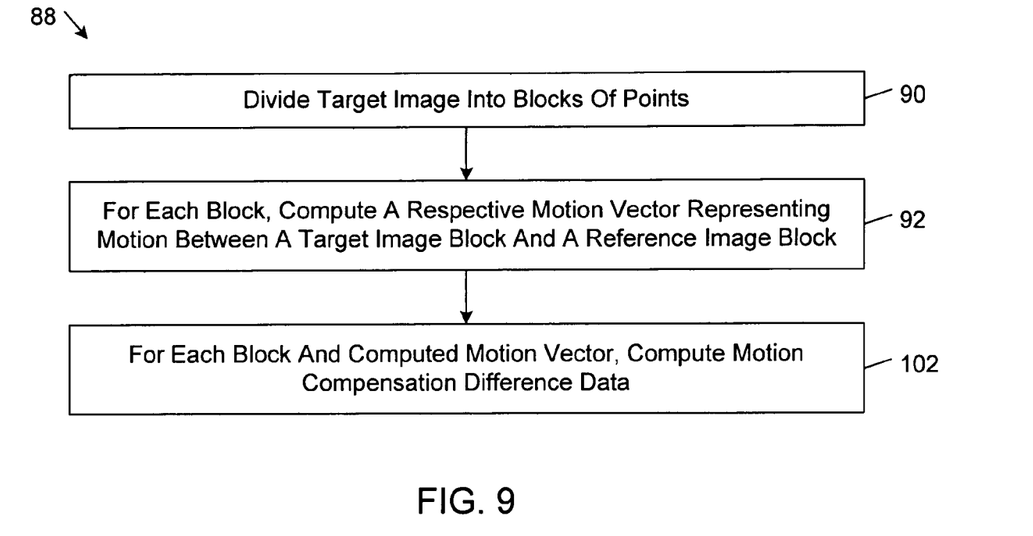
FIG. 9 is a flow diagram of an implementation of a method of computing a motion vector and motion compensation difference data for block of a target image.
Figure 10:
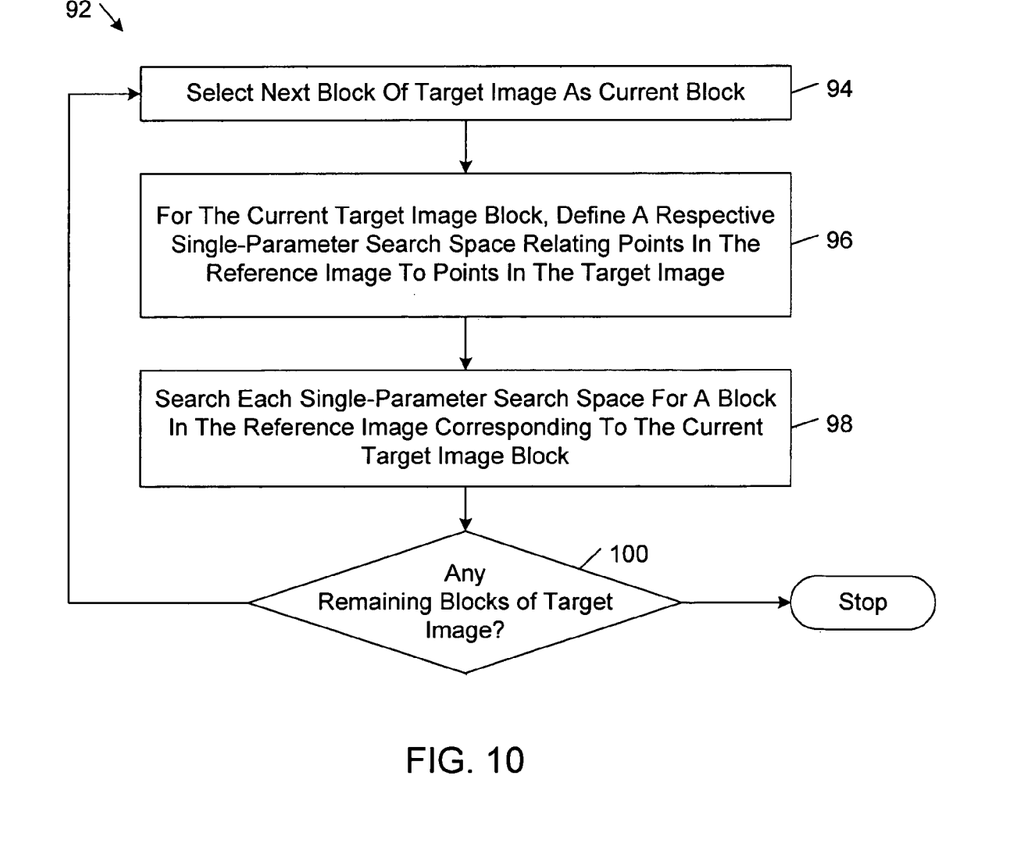
FIG. 10 is a flow diagram of an implementation of a method of computing motion vectors between blocks of a target image and corresponding blocks of a reference image.

Referring to FIGS. 9 and 10, in some embodiments, encoder 32 computes respective motion vectors for blocks of points in the target image. In this regard, encoder 32 divides the target image into an array of contiguous, non-overlapping blocks of points. (step 90). In other implementations, encoder 32 may compute motion vectors for nodes in a mesh-based representation of the target image.

For each block, the encoder 32 computes a respective motion vector representing motion between a target image block and a reference image block (step 92). In this process, the encoder selects the next block of the target image as the next block (step 94). For each target image block, the encoder defines a single-parameter search space relating the target image points to a block of points in the reference image (step 96). The single-parameter search space is defined with respect to the following motion model, which is derived from equation (7):

$$b_i' = (H_\pi \cdot b_i) + \Theta \cdot e_2 \qquad (9)$$

where $H_\pi$ is the computed transformation, $\Theta$ is a scalar, $e_2$ is the respective epipole, $b_i$ is any point within the target image block being encoded, and $b_i'$ is the corresponding point in the reference image lying on the epipolar line $l_i$. In this way, the search space for the points within block $b_i'$ in the reference image is parameterized by a single parameter $\Theta$. The encoder 32 searches each single-parameter search space for a block of points in the reference image corresponding to the current target image block (step 98). This process is repeated for each block in the target image (step 100).

In some implementations, a matching score is generated for each of multiple different values for $\Theta$ and the block $b_i'$ corresponding to the value of $\Theta$ producing the highest matching score is selected as the reference image block corresponding to the target image block. The matching score may be generated based on a correlation matching measure (e.g., the sum of the absolute values of the differences of the pixels between matched blocks, or the sum of the squares of the differences) or to some other point match (or correlation) measure. The value of $\Theta$ defines a motion vector since specification of $\Theta$ determines the reference image block matching the corresponding target image block.

For each block of the target image and for each computed motion vector, the encoder 32 also computes motion compensation difference data (step 102). The motion compensation difference data represents intensity adjustments to the points of the reference image block needed to reproduce the intensity values of the points of the target image block.

Referring back to FIG. 8, after the motion between the target image and the reference image has been estimated (step 88), the encoder 32 encodes the target image based at least in part on the estimated motion (step 104). In some implementations, encoder 32 may encode the target image in accordance with any known predictive coding technique. For example, in some implementations, encoder 32 may encode the target image in accordance with a motion compensation prediction approach. Encoder 32 also may incorporate non-motion-vector-based image compression methods in the process of encoding the target image, including spectral and spatial redundancy reduction methods. In addition, encoder 32 may use any color interleaving process to encode the target image before transmitting the encoded data over transmission channel 34.

Other embodiments are within the scope of the claims.

What is claimed is:

1. A machine-implemented method of encoding a target image of a scene captured at a first image plane, comprising:
   computing a transformation (H) mapping at least three noncollinear points substantially coplanar on a scene plane in the target image to corresponding points in a reference image of the scene captured at a second image plane different from the first image plane;

ascertaining an epipole ($e_{REF}$) in the reference image from at least one point in the target image off the scene plane and at least one corresponding point in the reference image;

determining respective values of a scalar parameter Θ that map blocks of points in the target image to respective matching blocks of points in the reference image in accordance with a motion model corresponding to $\vec{b}_{REF} = (H \cdot \vec{b}_{TARGET}) + \Theta \cdot \vec{e}_{REF}$, wherein $\vec{b}_{TARGET}$ is a vector that represents a point within a respective one of the blocks of the target image and $\vec{b}_{REF}$ is a vector that represents a point within a respective one of the blocks of the reference image; and compressing the target image, wherein the compressing comprises encoding ones of the blocks of the target image in terms of the reference image and the respective vectors $\vec{b}_{REF}$ that are specified by respective ones of the determined values of the scalar parameter Θ.

2. The method of claim 1, further comprising identifying the at least three scene plane points in the target image and the at least three corresponding scene plane points in the reference image.

3. The method of claim 1, wherein the motion model defines single-parameter search spaces each relating points in the reference image to respective points in the target image.

4. The method of claim 3, wherein the ascertaining comprises computing the epipole in the reference image based on the computed transformation and the identified corresponding off-scene-plane points.

5. The method of claim 4, wherein the motion model parameterizes an epipolar line extending through the computed epipole in the reference image.

6. The method of claim 5, wherein the motion model defines a respective single-parameter search space for each of the blocks of points in the target image.

7. The method of claim 6, wherein the epipolar line in the reference image extends through the epipole and a point corresponding to a mapping of a given point in the target image to a corresponding point in the reference image based on the computed transformation.

8. The method of claim 3, wherein the determining comprises dividing the target image into blocks of points and computing for each of the divided blocks a respective one of the vectors $\vec{b}_{REF}$ representing motion between a the divided block and a matching one of the reference image blocks.

9. The method of claim 8, wherein each of the vectors $\vec{b}_{REF}$ describes a one-to-one mapping between a respective one of the blocks of points in the target image and a matching one of the blocks of points in the reference image.

10. The method of claim 1, wherein the compressing comprises representing points of the target image in terms of the vectors $\vec{b}_{REF}$ and motion compensation difference data representing intensity adjustments to points of the reference image for reconstructing corresponding points of the target image.

11. An apparatus for encoding a target image of a scene captured at a first image plane, comprising an encoder operable to perform operations comprising:

computing a transformation (H) mapping at least three noncollinear points substantially coplanar on a scene plane in the target image to corresponding points in a reference image of the scene captured at a second image plane different from the first image plane;

ascertaining an epipole ($e_{REF}$) in the reference image from at least one point in the target image off the scene plane and at least one corresponding point in the reference image;

determining respective values of a scalar parameter Θ that map blocks of points in the target image to respective matching blocks of points in the reference image in accordance with a motion model corresponding to $\vec{b}_{REF} = (H \cdot \vec{b}_{TARGET}) + \Theta \cdot \vec{e}_{REF}$, wherein $\vec{b}_{TARGET}$ is a vector that represents a point within a respective one of the blocks of the target image and $\vec{b}_{REF}$ is a vector that represents a point within a respective one of the blocks of the reference image and;

compressing the target image, wherein the compressing comprises encoding ones of the blocks of the target image in terms of the reference image and the respective vectors $\vec{b}_{REF}$ that are specified by respective ones of the determined values of the scalar parameter Θ.

12. The apparatus of claim 11, wherein the encoder is further operable to identify the at least three scene plane points in the target image and the at least three corresponding scene plane points in the reference image.

13. The apparatus of claim 11, wherein the motion model defines single-parameter search spaces each relating points in the reference image to respective points in the target image.

14. The apparatus of claim 13, wherein in the ascertaining the encoder is operable to compute the epipole in the reference image based on the computed transformation and the identified corresponding off-scene-plane points.

15. The apparatus of claim 14, wherein the motion model parameterizes an epipolar line extending through the computed epipole in the reference image.

16. The apparatus of claim 15, wherein the motion model defines a respective single-parameter search space for each of the blocks of points in the target image.

17. The apparatus of claim 16, wherein the epipolar line in the reference image extends through the epipole and a point corresponding to a mapping of a given point in the target image to a corresponding point in the reference image based on the computed transformation.

18. The apparatus of claim 13, wherein in the determining the encoder is operable to perform operations comprising dividing the target image into blocks of points and computing for each of the divided blocks a respective one of the vectors $\vec{b}_{REF}$ representing motion between the divided block and a matching one of the reference image blocks.

19. The apparatus of claim 18, wherein each of the vectors $\vec{b}_{REF}$ describes a one-to-one mapping between a respective one of the blocks of points in the target image and a matching one of the blocks of points in the reference image.

20. The apparatus of claim 11, wherein in the compressing the encoder is operable to perform operations comprising representing points of the target image in terms of the vectors $\vec{b}_{REF}$ and motion compensation difference data representing intensity adjustments to points of the reference image for reconstructing corresponding points of the target image.

21. A computer-readable medium storing machine-readable instructions for causing a machine to perform operations comprising:

computing a transformation (H) mapping at least three noncollinear points substantially coplanar on a scene plane in the target image to corresponding points in a reference image of the scene captured at a second image plane different from the first image plane;

ascertaining an epipole ($e_{REF}$) in the reference image from at least one point in the target image off the scene plane and at least one corresponding point in the reference image;

determining respective values of a scalar parameter $\Theta$ that map blocks of points in the target image to respective matching blocks of points in the reference image in accordance with a motion model corresponding to $\vec{b}_{REF} = (H \cdot \vec{b}_{TARGET}) + \Theta \cdot \vec{e}_{REF}$, wherein $\vec{b}_{TARGET}$ is a vector that represents a point within a respective one of the blocks of the target image and $\vec{b}_{REF}$ is a vector that represents a point within a respective one of the blocks of the reference image; and compressing the target image, wherein the compressing comprises encoding ones of the blocks of the target image in terms of the reference image and the respective vectors $\vec{b}_{REF}$ that are specified by respective ones of the determined values of the scalar parameter $\Theta$.

22. The computer-readable medium of claim 21, wherein the machine-readable instructions further cause the machine to identify the at least three scene plane points in the target image and the at least three corresponding scene plane points in the reference image.

23. The computer-readable medium of claim 21, wherein the motion model defines single-parameter search spaces each relating points in the reference image to respective points in the target image.

24. The computer-readable medium of claim 23, wherein in the ascertaining the machine-readable instructions cause the machine to perform operations comprising computing the epipole in the reference image based on the computed transformation and the identified corresponding off-scene-plane points.

25. The computer-readable medium of claim 24, wherein the motion model parameterizes an epipolar line extending through the computed epipole in the reference image.

26. The computer-readable medium of claim 25, wherein the motion model defines a respective single-parameter search space for each block of points in the target image.

27. The machine-readable medium of claim 26, wherein the epipolar line in the reference image extends through the epipole and a point corresponding to a mapping of a given point in the target image to a corresponding point in the reference image based on the computed transformation.

28. The computer-readable medium of claim 23, wherein in the determining the machine-readable instructions cause the machine to perform operations comprising dividing the target image into blocks of points and computing for each of the divided blocks a respective one of the vectors $\vec{b}_{REF}$ representing motion between the divided block and a matching one of the reference image blocks.

29. The computer readable medium of claim 28, wherein each of the motion vectors $\vec{b}_{REF}$ describes a one-to-one mapping between a respective one of the blocks of points in the target image and a matching one of the blocks of points in the reference image.

30. The computer-readable medium of claim 21, wherein in the compressing the machine-readable instructions cause the machine to perform operations comprising representing points of the target image in terms of the vectors $\vec{b}_{REF}$ and motion compensation difference data representing intensity adjustments to points of the reference image for reconstructing corresponding points of the target image.

* * * * *

UNITED STATES PATENT AND TRADEMARK OFFICE
CERTIFICATE OF CORRECTION

PATENT NO.        : 7,463,778 B2                                      Page 1 of 1
APPLICATION NO. : 10/768239
DATED             : December 9, 2008
INVENTOR(S)       : Niranjan Damera-Venkata It is certified that error appears in the above-identified patent and that said Letters Patent is hereby corrected as shown below:

On the title page, in field (73), in "Assignee", in column 1, line 2, delete "L.P," and insert -- L.P., --, therefor.`

In column 6, line 30, delete "y'2×y$_2$" and insert -- y'$_2$×y$_2$ --, therefor.

In column 10, line 14, in Claim 11, delete "and;" and insert -- ; and --, therefor.

In column 12, line 10, in Claim 27, delete "machine" and insert -- computer --, therefor.

In column 12, line 23, in Claim 29, delete "readable" and insert -- -readable --, therefor.

Signed and Sealed this

Twenty-sixth Day of May, 2009

JOHN DOLL
*Acting Director of the United States Patent and Trademark Office*